Patented Mar. 2, 1948

2,436,926

UNITED STATES PATENT OFFICE 2,436,926

POLYMERIZATION OF ACRYLIC ACID NITRILES

Ralph Albert Jacobson, Landenburg, Pa., assignor to E. I. du Pont de Nemours & Company, Wilmington, Del., a corporation of Delaware No Drawing. Application August 2, 1943,
Serial No. 497,056

5 Claims. (Cl. 260—84)

This invention relates to the production of vinyl polymers and to novel methods for obtaining said polymers. More particularly, it relates to a new and improved process for the preparation of polymers and co-polymers of acrylonitrile.

Certain modifications of vinyl polymers containing acrylonitriles have obtained considerable industrial importance as synthetic rubbers and valuable plastic masses. The attractive physical properties of these co-polymers, such as their unusual toughness and high softening point, are somewhat overshadowed by the difficulties encountered in prior methods for their preparation.

Polymers of acrylonitrile and certain co-polymers containing minor proportions of polymeric modifiers have been found to possess very valuable properties when spun into fibers. Acrylonitriles are characterized by rather slow rates of polymerization and moreover have been co-polymerized only with great difficulty or not at all with certain unsaturated polymerizable compounds. Previous methods for obtaining said acrylonitrile polymers and co-polymers have entailed slow, uneconomical procedures which are not adaptable for efficient large-scale production and have frequently resulted in the formation of non-homogeneous products of inferior quality.

Before these acrylonitrile polymers and co-polymers can be used for spinning into fibers, it is essential that they be produced in as high a state of purity and at as low a cost as possible, and that their molecular weight shall be sufficiently high to insure the yield of optimum fiber properties. Available prior processes for the production of these acrylonitrile polymers and co-polymers are also incapable of fulfilling these requisites. Such procedures involve two-phase systems and are either of the organic solution, bulk or emulsion type. Thus, solution processes containing organic solvents are relatively slow and yield low molecular weight products; bulk methods yield hard, horny masses which must be comminuted before they can be dissolved to form the spinning dope; and emulsion processes, besides being more costly because of the added dispersing agent, yield products which are difficult to free from contaminating traces of dispersant.

It is among the objects of the present invention to overcome the foregoing and other disadvantages characterizing prior methods for obtaining polymers and co-polymers of acrylic acid nitriles and to remedy, in particular, the difficulties which have been heretofore encountered in the preparation of polymers and co-polymers of acrylonitrile. Other objects include: the provision of a novel process for the preparation of such polymers and co-polymers which is completely free of the disadvantages of said prior art procedures, such as poor yields and poor quality of product, whereby one is enabled to obtain directly and through a single-phase system relatively pure types of products of superior quality, to provide a method for the conjoint polymerization of acrylonitriles with certain monomers, to provide a rapid and efficient process for the polymerization and co-polymerization of acrylonitriles; and to provide a process for the preparation of said polymers and co-polymers, the product from which need not be subjected to the after-purification treatments which the products from prior methods have required. Other objects and advantages of the invention will be apparent from the following description thereof:

These and other objects are attainable in this invention which broadly comprises polymerizing acrylic acid nitriles by dissolving the nitrile in aqueous media and an oxygen-yielding catalyst, and employing such amount of aqueous media in the dissolving operation as will provide a homogeneous solution.

In a more specific and preferred embodiment, the invention comprises the production of a unique, contaminant-free polymer or co-polymer of acrylonitrile by polymerizing the acrylonitrile, either alone or in admixture with at least one other polymerizable, unsaturated compound, after its dissolution, together with a water-soluble, oxygen-yielding substance, and, optionally, a water-soluble, polymerizable adjuvant from the class of oxidizable, oxygen-containing sulfur compounds, in the minimum quantity of water required to produce a homogeneous solution.

In one practical and preferred adaptation of the invention, a homogeneous solution is first formed by introducing an aqueous solution containing about 0.1-4% of a perdisulfate salt and about 0.05-2% of a polymerization adjuvant such as sodium bisulfite into a suitable reaction vessel, provided with a nitrogen inlet, reflux condenser, and a stirrer, or other means for effecting agitation of its contents. This is followed by the addition of about 6-7% by weight of acrylonitrile, based on the total aqueous phase. The air in the free space is then displaced by an inert gas such as nitrogen and a gentle current of nitrogen is maintained over the mixture during polymerization. The stirrer is then started and the temperature of the solution is raised to a point in the range of about 30–50° C. and maintained as near to this point as practicable. Internal cooling may be necessary to maintain a constant temperature at the height of the polymerization reaction. The polymer precipitates as it is produced in the form of a very finely divided precipitate which, at the conclusion of polymerization, is filtered off, washed several times with hot water, and dried and recovered in a high state of purity.

The following examples are further illustrative of the present invention without, however, restricting it thereto, the parts given being by weight:

*Example I*

An aqueous solution containing 5% ammonium persulfate is saturated with arylonitrile and then heated with stirring at 50° C. under a nitrogen atmosphere. Within 5 minutes a copious precipitate of polymer has formed and the reaction is complete within 1 hour. The product is filtered off, washed well with water and dried. It dissolves readily in dimethyl formamide to give viscous solutions which may be cast on heated surfaces to yield clear, strong films, or spun to fibers by the dry-spinning process.

*Example II*

A solution consisting of 1400 parts of water, 2 parts of ammonium persulfate, and 0.4 part of sodium bisulfite is placed in a glass reactor equipped with a stirrer, nitrogen inlet, and reflux condenser. Stirring is started and a mixture of 94 parts of acrylonitrile and 6 parts of methacrylamide is added, giving a clear solution. Polymerization commences within a few minutes and the temperature is maintained at 29–30° C. by cooling. Polymerization is complete within 1½ hours. The polymer is isolated as in Example I and after drying amounts to 95 parts. It can be cast into films or spun into fibers from a solution in dimethyl formamide. The fibers are very resistant to heat and accept acid, basic, and acetate-type dyes more readily than fibers of unmodified polyacrylonitrile.

*Example III*

A mixture of 96 parts of acrylonitrile, 2 parts of methacrylic acid, and 2 parts of dimethylaminoethyl methacrylate is polymerized exactly as in Example II, except that the temperature is allowed to reach 36° C. A good yield of product is obtained. This, when formed into films and fibers, shows exceptionally good receptivity for acid, neutral, and acetate dyes. The dyeings are very resistant to fading on exposure to ultraviolet light.

*Example IV*

A mixture of 90 parts of acrylonitrile and 10 parts of methyl acrylate is polymerized exactly as in Example II, except that the temperature is allowed to reach 49° C. and polymerization is allowed to proceed for 2½ hours. The yield of polymer after the working-up procedure amounts to 89 parts. The molecular weight is 75,000, when calculated from the Staudinger relationship, $\eta_{sp}/C = K_m \times M$, where $\eta_{sp} = \eta_{rel} - 1$, $C = 0.0189$, and $K_m = 1.5 \times 10^{-4}$.

*Example V*

A mixture of 95 parts of acrylonitrile and 5 parts of methacrylic acid is polymerized as in Example II, the polymerization cycle amounting to 3 hours and the temperature reaching 44° C. at the peak of the polymerization reaction. The yield of polymer after the working-up procedure amounts to 92 parts. The molecular weight determined as in Example IV is 224,000. Films and fibers formed from solutions in dimethyl formamide show excellent strength and good dye receptivity.

*Example VI*

A mixture of 98 parts of acrylonitrile and 2 parts of methacrylonitrile is polymerized as in Example II in a solution consisting of 1400 parts of water, 1 part of ammonium persulfate and 0.3 part of sodium bisulfite. The temperature is maintained at 35° C. for a total of 2 hours. At the end of this time, the polymer is isolated as in Example II and, after drying, amounts to 82 parts. The molecular weight is 121,000. Films of the polymer, after being stretched 10-fold at 100° C., set at 150° C. under tension, and relaxed at 120° C., show a tensile strength of 40,000 lbs./sq. in. with an elongation of 15%. The retraction on immersion in boiling water for prolonged periods of time is about 2%.

*Example VII*

A mixture of 98 parts of acrylonitrile and 2 parts of vinyl acetate is polymerized exactly as in Example VI, except that the temperature of 35° C. is maintained for 3 hours. Eighty parts of dry polymer is obtained. The molecular weight is 141,000. Films of the polymer after stretching as in Example VI have a tensile strength of 44,000 lbs./sq. in. with an elongation of 17%. A strip of the unstretched film, when pressed into contact with a heated brass block at 5° C. temperature intervals beginning at 100° C., does not stick to the block until the temperature reaches 222° C.

*Example VIII*

A mixture of 100 parts of acrylonitrile and 0.1 part of lauryl mercaptan is polymerized as in Example VI for a total of 2½ hours. The yield of polymer is 86 parts and the molecular weight is 120,000. The sticking temperature of a film cast from dimethyl formamide and determined as in Example VII is 228° C., and the tensile strength of a film stretched as in Example VI is 52,000 lb./sq. in. with an elongation of 23%.

*Example IX*

A mixture of 96 parts of acrylonitrile and 4 parts of N-vinyl succinimide is polymerized as in Example VI to yield 94 parts of polymer. Films cast from 10% solutions of the product in dimethyl formamide are brilliantly clear and show excellent tensile properties.

As indicated, the invention is best adapted to and therefore preferably contemplates the polymerization and/or copolymerization of acrylonitrile with minor proportions of other polymerizable modifiers. Analogs of acrylonitrile, such as alpha-methacrylonitrile, alpha-ethacrylonitrile, alpha-phenylacrylonitrile, and alpha-chloroacrylonitrile, are also polymerizable in accordance with the invention and hence said invention is to be considered as generic to the polymerization of nitriles of acrylic acids and its analogs. Due, however, to their relatively low solubility in water and the necessity of using excessively large reactors to obtain a more desirable polymer yield, these analogs, though utilizable, are not recommended for use, especially in those instances where optimum results are sought and a most economic type of process is desired.

The process may also be advantageously used to produce co-polymers of acrylonitrile with minor proportions of other polymerizable or co-polymerizable compounds, such as acrylic, methacrylic, and alpha-chloroacrylic acids; methyl methacrylate, ethyl methacrylate, butyl methacrylate, octyl methacrylate, 2-nitro-2-methyl propyl methacrylate, methoxyethyl methacrylate, chloroethyl methacrylate, phenyl methacrylate, cyclohexyl methacrylate, dimethyl aminoethyl methacrylate, and the corresponding esters of acrylic or alpha-chloroacrylic acids; acryl- and methacrylamides or monoalkyl substitution products thereof; unsaturated ketones such as methyl vinyl ketone, phenyl vinyl ketone, and methyl isopropenyl ketone, vinylidene chloride, vinyl chloride, vinyl fluoride, vinyl carboxylates such as vinyl acetate, vinyl chloroacetate, vinyl propionate, vinyl butyrate, vinyl benzoate, vinyl thiolacetate, and vinyl stearate, ethylene-alpha, beta-dicarboxylic acids, or their anhydrides or derivatives such as maleic anhydride, fumaric, maleic, citraconic, and mesaconic esters, N-alkyl maleimides; N-vinyl carbazole, N-vinyl succinimide, N-vinyl phthalimide; vinyl ethers, mono-olefins or substitution products thereof such as styrene, furyl ethylene, ethylene, and isobutylene.

The amount of water which is present or employable in making up the homogeneous solution or mixture which is essential and critical to the present invention is somewhat variable and depends upon the solubility characteristics of the acrylonitrile monomer or homolog, as well as the prevailing temperature conditions. Thus, the solubility of acrylonitrile in water ranges from 7.2% at 0° C. to about 10% to 50° C. Accordingly, contemplated for use in the invention are amounts of aqueous media sufficient only to satisfy the solubility characteristics of the monomer at the particular running temperature. For most practical purposes, the lower limit of monomer concentration to be used in the process may be set at about 5%, although, if desired, lower concentrations may be used. As exemplified in the foregoing examples, the solubility of acrylonitrile alone in the usual aqueous medium is about 7.5, while, as indicated, at temperatures approaching 50° C., it is soluble to the extent of about 10%. Hence, this latter range of concentration is preferred for use in the invention.

Since the solubility in water of mixtures of one or more of the compounds listed above with acrylonitrile is not predictable, no fixed limit can be set for the composition of the polymerization mixture and the proportion of co-polymerizable component other than acrylonitrile must be so selected that the limit of solubility of the monomer mixture in the polymerization medium at the polymerization temperature selected is not exceeded. It is the particular advantage of the present process that polymerization takes place in a homogeneous mixture and therefore the composition of co-polymers produced from a given monomer mixture is much more likely to equal or approximate the initial monomer composition than is the polymer produced under conditions prevailing in the usual emulsion polymerization process.

In general, the percentage of co-polymerizable ingredients based on total monomers which may be employed to give homogeneous solutions having a concentration of at least 5% of total polymerizables will vary from about 5% to 50%. The upper limit may be reached with highly water-soluble monomers, such as acrylic and methacrylic acids and acrylic and methacrylic amides. Moderately soluble monomers, such as vinyl acetate, methyl acrylate, and methyl vinyl ketone may be present to the extent of about 10 to 40% of the total monomer mixture, while relatively insoluble materials such as methyl methacrylate, styrene, and vinylidene chloride will be restricted to concentrations of about 1 to 10%.

In addition to the polymerizable modifiers enumerated above, other modifying ingredients may be added to the acrylonitrile prior to polymerization. Such modifiers include mercaptans, polyhalogenated compounds, aldehydes, ketones, esters, dioxolanes, hydrazines, and ethers. These modifiers are generally employed in amounts of less than 1% of the total monomer and are used to regulate the molecular weight of the polymer.

Of the various polymerization catalysts available for use in the invention, it is preferred to employ those which are water-soluble in character. Among these are the ammonium and alkali salts of perdisulfuric acid, the ammonium and alkali salts of perboric acid, hydrogen peroxide, peracetic acid, urea-peroxide, diacetyl peroxide, and the like. Ammonium, sodium, potassium and lithium perdisulfate are particularly useful, with ammonium perdisulfate being preferred for economic reasons. The concentration of catalyst may be varied within wide limits. For instance, amounts varying from 0.1% to 10% of the quantity of monomer employed are operable, but the preferred proportion of catalyst lies in the range of 0.1% to 4% based on the total weight of monomers employed.

Also contemplated for use in this invention are catalyst activators or polymerization adjuvants in addition to the oxygen-yielding catalysts to promote rapid polymerization. The most effective activators are oxygen-containing sulfur compounds which are capable of undergoing oxidation. Examples of these are sodium bisulfite, sulfur dioxide, sodium hydrosulfite, sodium thiosulfate, diethyl sulfite, diethyl sulfoxide, formamidine sulfinic acid, and para-toluene sulfinic acid. In general, the quantity of activator employed will vary from about 0.1 to 1 molar proportion based on the catalyst employed. The addition of the activator to the reaction mixture is frequently attended by a marked surge in temperature and care must be taken to remove the excessive heat generated in such cases. The total quantity of activator may be added initially to the reaction mixture or in small proportions during the course of polymerization. The latter method affords a convenient procedure for regulating the amount of heat produced in a given time. The molar ratio of activator to catalyst is an important factor in determining the rate of polymerization and also the molecular weight of the polymer produced.

The invention may also be carried out in alkaline, acid, or neutral media. However, it is preferred to operate in an aqueous medium whose pH may vary from about 2 to about 5 since this range appears to enhance the polymerization of acrylonitrile. In co-polymerizations the selection of the pH will be governed to a considerable degree by the nature of the monomer which is conjointly polymerized with acrylonitrile. For example, when vinyl esters of carboxylic acids are employed, care must be taken to prevent the hydrolysis of the ester. If it is desired to avoid pH changes during the course of the polymerization, suitable buffers may be added to the aqueous medium.

It is well known that the rate of vinyl polymerization is influenced by the temperature, and that in most prior art processes polymerization at low temperatures is impracticably slow. The present process, on the other hand, permits of successful operation at temperatures as low as 2-5° C. However, since the products formed at these low temperatures may be of relatively high molecular weight and be difficult to fabricate, it is preferred to operate in the range of about 20-50° C. The process is eminently suited for continuous operation when it is carried out near the upper limit of this temperature range. Although the range of 20-50° C. is indicated as preferred, temperatures up to 72° C. may also be employed, if desired.

While acrylonitrile is not as susceptible to the inhibiting effect of oxygen as are many other polymerizable compounds, it is nevertheless advantageous to conduct the polymerization in the absence of air. The air may be displaced from the polymerization vessel by means of an inert gas which does not reduce the rate of polymerization. Suitable gases therefor include nitrogen, carbon dioxide, methane and helium.

The process is not limited to an atmospheric operation but may be conducted under superatmospheric pressures. Similarly, it is not limited to any particular apparatus but it is important that the reaction vessel shall be constructed of material which has no effect on the rate of polymerization nor on the quality of the products and is not effected by the aqueous medium used in carrying out the polymerization. Suitable reaction vessels comprise those constructed of stainless steel, nickel, silver, or lead. Vessels equipped with glass or enamel liners are also suitable.

The products of this invention at the conclusion of polymerization are thin slurries of finely-divided powders suspended in the aqueous medium. If they are allowed to stand for some period of time, the particles eventually separate out completely, leaving a clear supernatant liquid. The settling process and subsequent filtration are greatly facilitated if the polymer slurry is heated to about 95° C. before the filtration. This heat treatment tends to cause the finely-divided particles to coalesce. After such heat treatment, the mixture is filtered or centrifuged, and washed repeatedly with water to remove traces of electrolyte which may adhere to the particles. In order to facilitate the low temperature drying of the polymers, it is beneficial to employ a final wash with a lower aliphatic alcohol such as methanol or ethanol, or with acetone. If a spray drying operation is to be employed, the preliminary heat treatment is omitted and the thin slurry as initially produced may be sprayed into a heated and/or evacuated chamber to remove the water.

The products prepared according to the present invention, due to their unique properties, are most suitable for the preparation of films, foils, and fibers. For these purposes, the polymer may be suitably combined with or prepared in the presence of plasticizers, stabilizers, fillers, pigments, dyes, softeners, natural resins, or other synthetic resins.

I claim as my invention:

1. A process for the polymerization of a member of the group consisting of (1) acrylic acid nitrile and (2) a mixture of acrylic acid nitrile together with a minor proportion of another copolymerizable, unsaturated compound, to obtain a dimethyl formamide-soluble polymer which consists in dissolving a member of the group consisting of (1) acrylic acid nitrile and (2) a mixture of acrylic acid nitrile together with a minor proportion of another copolymerizable, unsaturated compound and a water-soluble, oxygen-yielding peroxy catalyst compound in an amount of water sufficient only to provide a homogeneous solution and to satisfy the solubility characteristics of said nitrile at the running temperature employed, and then polymerizing said member of the group consisting of (1) acrylic acid nitrile and (2) a mixture of acrylic acid nitrile together with a minor proportion of another copolymerizable, unsaturated compound, at a temperature of from 20° C.-50° C.

2. A process for the polymerization of acrylic acid nitrile to obtain a dimethyl formamide-soluble polymer which consists in dissolving said nitrile together with a minor proportion of another co-polymerizable, unsaturated compound and a water-soluble, oxygen-yielding peroxy compound catalyst employing in the dissolving operation an amount of water sufficient only to provide a homogeneous solution and to satisfy the solubility characteristics of said nitrile at the running temperature employed, and then polymerizing the dissolved monomers at a temperature of from 20° C.-50° C.

3. A process for the polymerization of acrylonitrile to obtain a dimethyl formamide-soluble polymer which consists in dissolving said acrylonitrile, together with from 0.1% to 10%, based on the quantity of monomer, of ammonium perdisulfate as a catalyst, in an amount of water sufficient only to provide a homogeneous solution and to satisfy the solubility characteristics of said nitrile at the running temperature which is employed, and then polymerizing the dissolved acrylonitrile at a temperature of from 20° C.-50° C.

4. A process in accordance with claim 1 wherein the water-soluble, oxygen-yielding catalyst is the ammonium salt of perdisulfuric acid.

5. A process for obtaining an improved polymerization product soluble in dimethyl formamide, which consists in dissolving acrylonitrile, together with a minor proportion of another copolymerizable, unsaturated compound and ammonium perdisulfate in the minimum quantity of water required to produce a homogeneous solution, polymerizing the resulting homogeneous product at temperatures ranging from 20° C. to 50° C., and thereafter isolating, drying and recovering the resulting polymer.

RALPH ALBERT JACOBSON.

REFERENCES CITED

The following references are of record in the file of this patent:

UNITED STATES PATENTS

| Number | Name | Date |
|---|---|---|
| 2,097,263 | Strain | Oct. 6, 1937 |
| 2,289,540 | Dittmar | July 14, 1942 |
| 2,326,078 | Trommsdorff | Aug. 3, 1943 |
| 2,326,326 | Breedis | Aug. 10, 1943 |
| 2,333,635 | Britton | Nov. 9, 1943 |
| 2,356,767 | Kropa | Aug. 29, 1944 |